US012776717B2

(12) United States Patent
Aqui Tapia et al.

(10) Patent No.: US 12,776,717 B2
(45) Date of Patent: Oct. 27, 2026

(54) RESONANT CONVERTER WITH WIDE INPUT AND OUTPUT VOLTAGE RANGE

(71) Applicant: Deere & Company, Moline, IL (US)

(72) Inventors: Juan A. Aqui Tapia, Nuevo Leon (MX); Richard E. Wainwright, West Fargo, ND (US)

(73) Assignee: Deere & Company, Moline, IL (US)

( * ) Notice: Subject to any disclaimer, the term of this patent is extended or adjusted under 35 U.S.C. 154(b) by 258 days.

(21) Appl. No.: 18/680,388

(22) Filed: May 31, 2024

(65) Prior Publication Data

US 2025/0373171 A1 Dec. 4, 2025

(51) Int. Cl.

| | |
|---|---|
| ***H02M 3/335*** | (2006.01) |
| ***H02M 1/00*** | (2006.01) |
| ***H02M 1/088*** | (2006.01) |
| ***H02M 3/00*** | (2006.01) |

(52) U.S. Cl.

CPC ..... *H02M 3/33584* (2013.01); *H02M 1/0058* (2021.05); *H02M 1/088* (2013.01); *H02M 3/01* (2021.05); *H02M 3/33576* (2013.01); *H02M 3/33592* (2013.01)

(58) Field of Classification Search

CPC ............... H02M 3/01; H02M 3/33576; H02M 3/33584; H02M 3/33592

See application file for complete search history.

(56) References Cited

U.S. PATENT DOCUMENTS

| | | | | |
|---|---|---|---|---|
| 2017/0104365 | A1* | 4/2017 | Ghosh | H02J 9/061 |
| 2022/0230797 | A1 | 7/2022 | Afsharian et al. | |
| 2022/0393617 | A1 | 12/2022 | Tsukada | |

FOREIGN PATENT DOCUMENTS

| | | | | |
|---|---|---|---|---|
| CN | 107888074 | A | 4/2018 | |
| CN | 111682774 | A | 9/2020 | |
| CN | 116614003 | A | 8/2023 | |
| CN | 116780907 | A * | 9/2023 | H02M 3/33584 |
| CN | 116979813 | A | 10/2023 | |
| DE | 102023101703 | A1 | 8/2023 | |
| EP | 3605820 | B1 | 5/2023 | |
| JP | 2002165448 | A | 6/2002 | |
| KR | 101837603 | B1 | 3/2018 | |

OTHER PUBLICATIONS

Extended European Search Report and Written Opinion issued in European Patent Application No. 25168816.4 dated Sep. 15, 2025, in 09 pages.

* cited by examiner

*Primary Examiner* — Gary A Nash

(74) *Attorney, Agent, or Firm* — Tucker Ellis LLP

(57) ABSTRACT

A bidirectional DC-DC converter having at least two secondary inductors on a secondary side of a transformer. The converter includes at least two switches respectively coupled to the at least two secondary inductors. Through selective operation of the switches, a gain of the converter can be changed by selectively coupling one secondary inductor to a primary inductor in accordance with an operating mode.

16 Claims, 5 Drawing Sheets

Vin=600-800V, vo=48-60V, P=15kW

Forward mode

502

| Po(kW) | Input (V) | Output(V) | f(kHz) | Efficiency(%) | Results |
|---|---|---|---|---|---|
| 15 | 800 | 60 | 55.3 | 91 | ok |
| | | 48 | 55.7 | 90 | ok |
| | 600 | 48 | 53.4 | 91.3 | ok |
| | | 60 | 51 | 97 | ok |

Back mode

504

| Po(kW) | Input (V) | Output(V) | f(kHz) | Efficiency(%) | Results |
|---|---|---|---|---|---|
| 15 | 48 | 600 | 57.2 | 91 | ok |
| | | 800 | 50.1 | 94.2 | ok |
| | 60 | 600 | 60.7 | 90 | ok |
| | | 800 | 61 | 90 | ok |

Back mode without modification

506

| Po(kW) | Input (V) | Output(V) | f(kHz) | Efficiency(%) | Results |
|---|---|---|---|---|---|
| 2.69 | 48 | 269 | 57.2 | 90.7 | Not ok |
| 4.35 | | 431 | 50.1 | 93 | Not ok |
| 2.28 | 60 | 223 | 60.7 | 90 | Not ok |
| 2.64 | | 338 | 61 | 89.7 | Not ok |

FIG. 5

RESONANT CONVERTER WITH WIDE INPUT AND OUTPUT VOLTAGE RANGE

BACKGROUND

One area of development in clean energy technology is the use of batteries as energy storage together with a converter employed as an energy processor. With this development, a charging range of batteries and an input voltage range of the energy processor continue to increase. The demands on the energy processor also change with this evolution.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In one implementation, a converter is provided. The converter includes a primary side having a primary inductor and a secondary side having at least two secondary inductors. The converter is operable in at least two operating modes and a different secondary inductor of the at least two secondary inductors is disconnected in each operating mode of the at least two operating modes.

In another implementation, a system is provided. The system includes a bidirectional direct current to direct current (DC-DC) converter, at least one of a power supply or a load operatively coupled to a first side of the bidirectional DC-DC converter, and a battery operatively coupled to a second side of the bidirectional DC-DC converter. The bidirectional DC-DC converter includes a primary side having a primary inductor and a secondary side. The secondary side includes a first secondary inductor configured to provide a first gain in a forward mode, a second secondary inductor configured to provide a second gain in a backward mode, a first switch configured to operatively couple the first secondary inductor based on an operating mode, and a second switch configured to operatively couple the second secondary inductor based on the operating mode.

In yet another implementation, a bidirectional converter for operatively coupling a battery to at least one of a load or a power supply is provided. The converter a transformer having a primary inductor coupled to two secondary inductors, the two secondary inductors including a first secondary inductor and a second secondary inductor. The converter also includes a resonant tank on the primary side of the transformer. In addition, the converter includes a full bridge inverter on the primary side of the transformer, the full bridge inverter having two legs, each leg having two transistors. Further, the converter includes a first switch on the secondary side of the transformer, the first switch configured to operatively connect the first secondary inductor based on an operating mode. The converter also includes a second switch on the secondary side of the transformer, the second switch configured to operatively connect the second secondary inductor based on the operating mode. Still further, the converter includes a three-leg rectifier on the secondary side of the transformer, where each leg includes two transistors. In a forward mode, the first switch connects the first secondary inductor, the second switch disconnects the second secondary inductor, and a first leg of the three-leg rectifier is turned off to provide a first gain. In a backward mode, the first switch disconnects the first secondary inductor, the second switch connects the second secondary inductor, and a second leg of the three-leg rectifier is turned off to provide a second gain.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

BRIEF DESCRIPTION OF THE DRAWINGS

Various non-limiting embodiments are further described in the detailed description given below with reference the accompanying drawings, which are incorporated in and constitute a part of the specification.

FIG. 5 is a comparison between a performance of the converter described herein and a performance of a conventional converter.

DETAILED DESCRIPTION

Figure 1:
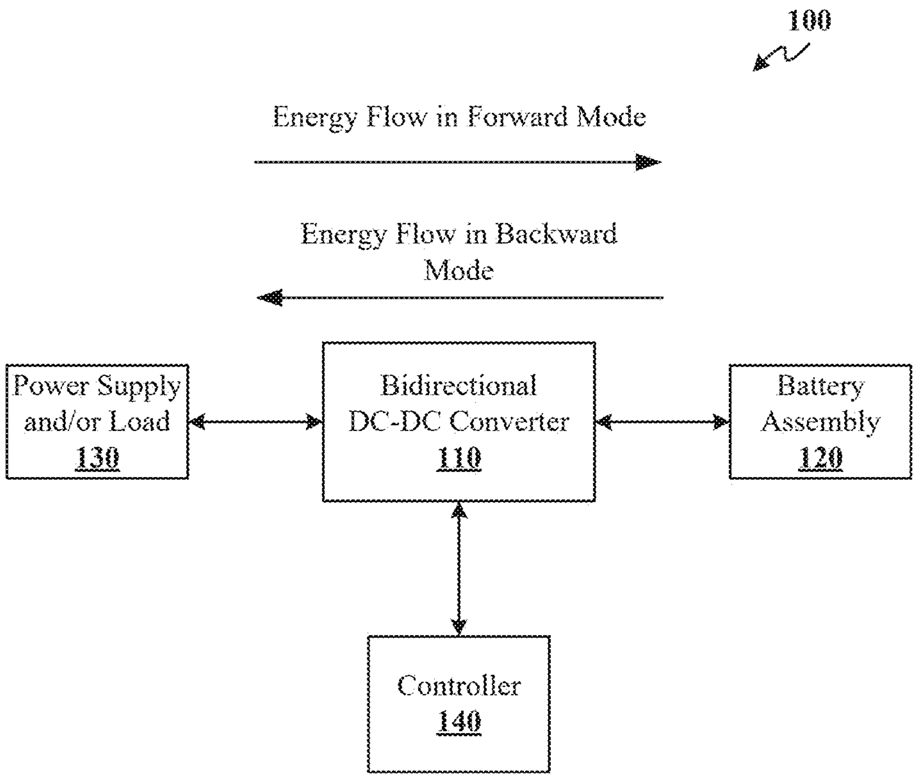
FIG. 1 illustrates a schematic diagram of an exemplary, non-limiting implementation of a battery-electric system according to various aspects.

As described above, the charging range and input voltage range to an energy processor is increasing. Conventional bidirectional converters (e.g. DC-DC converters) are unable to meet these demands. For example, referring to table 506 of FIG. 5, a conventional bidirectional converter does not provide a sufficient output voltage in backward mode.

A bidirectional converter is described herein. With the converter described herein, an input range and an output range are increased. In one implementation, the bidirectional converter may be utilized as a battery charger and as a power supply to a load (e.g. to an inverter) when the batteries supply energy. According to one exemplary implementation of the converter, the converter may include a transformer where two secondary inductors are coupled to one primary inductor. On a primary side of the transformer, the converter may include a DC power supply or a load (depending on mode), a full bridge inverter, and an inductor-inductor-capacitor (LLC) resonant tank. On a secondary side of the transformer, the converter may include three legs of transistors (e.g. such as MOSFETs), an output capacitive filter, two switches, and a battery assembly. The above structure is exemplary on one implementation. Similar structures having varying numbers of the components above are contemplated.

In an aspect, the converter may have at least two operating modes. With a forward mode, energy flows from the primary side to the secondary side. In other words, energy flows from a power supply to the batteries. The full bridge inverter on the primary side may include transistors. In the forward mode, the transistors on the primary side and the secondary may operate at a frequency lower than a resonant frequency to achieve high efficiency. As noted above, the converter includes two secondary inductors. The gain of the converter is based on one of the two secondary inductors, the primary inductor, the operating frequency, and a specification of the LLC resonant tank. The other inductor of the two secondary inductors is removed from the converter using one of the two switches. In a further example, one leg of the three legs of transistors on the secondary side is turned off in the forward mode.

With a backward mode, the energy flows from the secondary side to the primary side. In other words, energy flows from the batteries to a load. The secondary inductor coupled to the primary inductor in the forward mode is removed from the converter via one of the switches and the other secondary inductor (e.g. not operable in the forward mode) is coupled to the primary inductor. In the backward mode, a leg of the three legs of transistors on the secondary side is turned off. In an example, the leg turned off in the backward mode is different than the leg turned off in the forward mode. In backward mode, the gain is based on the secondary inductor coupled to the primary inductor, the operating frequency, and an LC resonant tank. In a further example, the transistors on the primary side and the secondary side operate at a same frequency in the backward mode.

The converter described herein utilizes at least two secondary inductors, selectively coupled to a primary inductor according to an operating mode, to change a voltage gain. The converter operates in a wide input and output voltage range with high efficiency. Accordingly, the converter can be dual-purpose as an energy processor to charge a battery and also as a power supply. In an exemplary embodiment, the converter includes one additional transistor (e.g. MOSFET) leg, an additional inductor, and two switches compared to a conventional LLC resonant converter.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Referring initially to FIG. 1, an exemplary, non-limiting implementation of battery-electric system 100 is illustrated. System 100 may be utilized in a battery-electric machine or vehicle. In such a machine, a battery is utilized to power a load such as an electric motor or other electrical equipment. The battery-electric machine also includes components to enable charging of the battery.

As shown in FIG. 1, system 100 may include a bidirectional direct-current-to-direct-current converter 110. The bidirectional direct-current-to-direct-current converter 110 is also referred to herein as bidirectional DC-DC converter 110, bidirectional converter 110, and/or converter 110. Converter 110 can operate as an energy processor in a forward mode and a backward mode. As shown in FIG. 1, energy flows from a power supply 130 to battery assembly 120 in the forward mode. In the backward mode, energy flows from the battery assembly 120 to a load 130. The battery assembly 120 includes one or more batteries configured to supply electrical power.

In some implementations, system 100 includes a controller 140 to control aspects of converter 110 and/or system 100 as described herein. Controller 140 may be a computer processor, a computing device, an electronic control unit, a system-on-a-chip (SOC), a microcontroller or the like.

Figure 2:
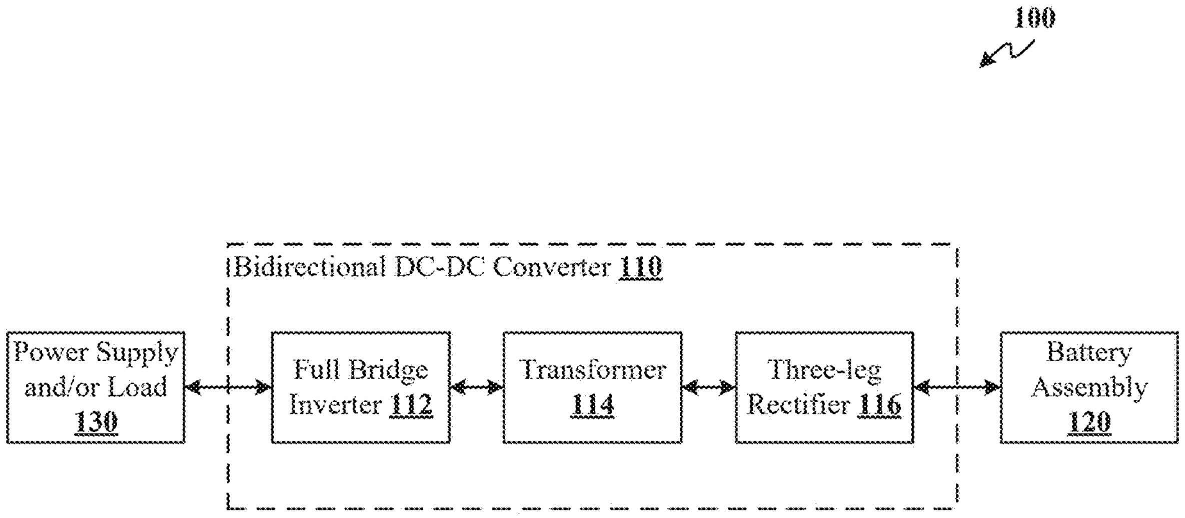
FIG. 2 illustrates a schematic diagram of an exemplary, non-limiting implementation of a converter for the battery-electric system in accordance with one or more aspects.

Turning to FIG. 2, converter 110, in an exemplary, non-limiting implementation, may include a transformer 114, which is described in greater detail below. On a primary side of transformer 114, which couples to power supply and/or load 130, converter 110 may include a full bridge inverter 112. On a secondary side of transformer 114, which couples to battery assembly 120, the converter 110 may include a three-leg rectifier 116. While the non-limiting exemplary implementations described herein include a full bridge inverter, it is to be appreciated that converter 110 may utilize a half bridge inverter on the primary side. Accordingly, the converter described herein may be utilized with substantially any type of inverter.

Figure 3:
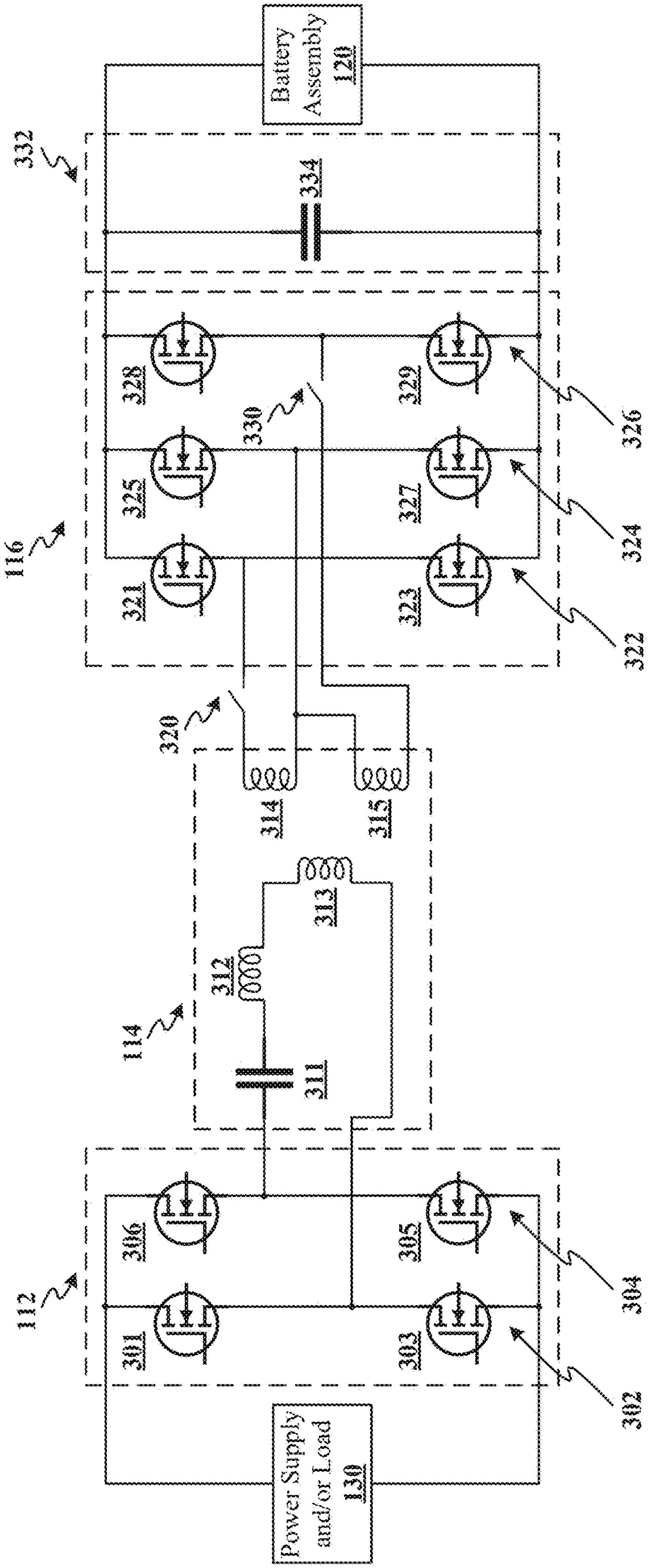
FIG. 3 illustrates a schematic circuit diagram of an exemplary, non-limiting implementation for the converter according to various aspects.

Referring now to FIG. 3, a schematic circuit diagram of an exemplary, non-limiting implementation of converter 110 is depicted. As shown in FIG. 3, an exemplary implementation of full bridge inverter 112 may include a first leg 302 and a second leg 304. Each leg 302 and 304 may include a pair of transistors 301, 303, 305, and 306, respectively. In some examples, transistors 301, 303, 305, and 306 are metal-oxide-silicon field effect transistors (MOSFETs).

Transformer 114 may include an inductor-capacitor (LC) circuit having a capacitor 311 and an inductor 312. Together with a primary inductor 313, an LLC resonant tank is provided. On the secondary side of transformer 114, two secondary inductors 314 and 315 are provided. A first secondary inductor 314 is coupled to a first switch 320 and a second secondary inductor 315 is coupled to a second switch 330. When a respective switch is closed, the respectively coupled inductor forms a part of the circuit. When the respective switch is open, the respectively coupled inductor is removed from the circuit. As described herein, through operation of switches 320, 330, a selected secondary inductor from the secondary inductors 314 and 315 is coupled to the primary inductor 313.

The three-leg rectifier 116 includes three legs 322, 324, and 326. Each leg 322, 324, and 326 includes a pair of transistors 321, 323, 325, 327, 328, and 329, respectively. Transistors 321, 323, 325, 327, 328, and 329 may be MOSFETs in some implementations. A capacitive filter 332 having a capacitor 334 may also be included on the secondary side of transformer 114.

As described above, converter 110 may operate in a forward mode or a backward mode. In the forward mode, energy flows from the primary side to the secondary side. That is, energy flows from the power supply 130 to battery assembly 120, thereby charging the batteries. In forward mode, switch 320 may be closed to couple secondary inductor 314 to primary inductor 313. Switch 330 may be open to remove secondary inductor 315. Thus, the gain of the circuit is based on the turn ratio provided by the primary inductor 313 and secondary inductor 314 in the forward mode. In a further aspect, transistors 328 and 329 may be turned off. In addition, transistors 301, 303, 305, 306, 321, 323, 325, and 327 may operate at a resonant frequency.

In a backward mode, energy flows from the secondary side to the primary side. That is, energy flows from the battery assembly 120 to a load 130. In backward mode, switch 330 may be closed to couple secondary inductor 315 to the primary inductor 313. Switch 320 may be open to remove secondary inductor 314. Thus, the gain of the circuit, in the backward mode, is based on the turn ratio provided by the primary inductor 313 and the secondary inductor 315.

Transistors 321 and 323 may be turned off. Transistors 301, 303, 305, 306, 325, 327, 328, and 329 work at the same frequency.

According to a further implementation, transformer 114 may include an LC resonant circuit on the secondary side. In addition, various combinations of secondary windings with primary windings can increase voltage gain. For instance, in forward mode, inductor 314 and inductor 315 may be considered one inductor. Accordingly, the gain may be determined based on inductor 314 plus inductor 315, together with the primary inductor 313. In backward mode, inductor 315 is operable so the gain depends on inductor 315 and inductor 313. This variation of forward mode may be a third mode available to converter 110. In this third mode, the switches 320, 330 can be controlled to enable both inductor 314 and inductor 315.

In an aspect, the transistors 301, 303, 306, 305, 321, 323, 325, 327, 328, and 329 may be controlled (e.g. turned on and off) via signals from controller 140. Switches 320 and 330 may also be electronically controlled by controller 140.

Figure 4:
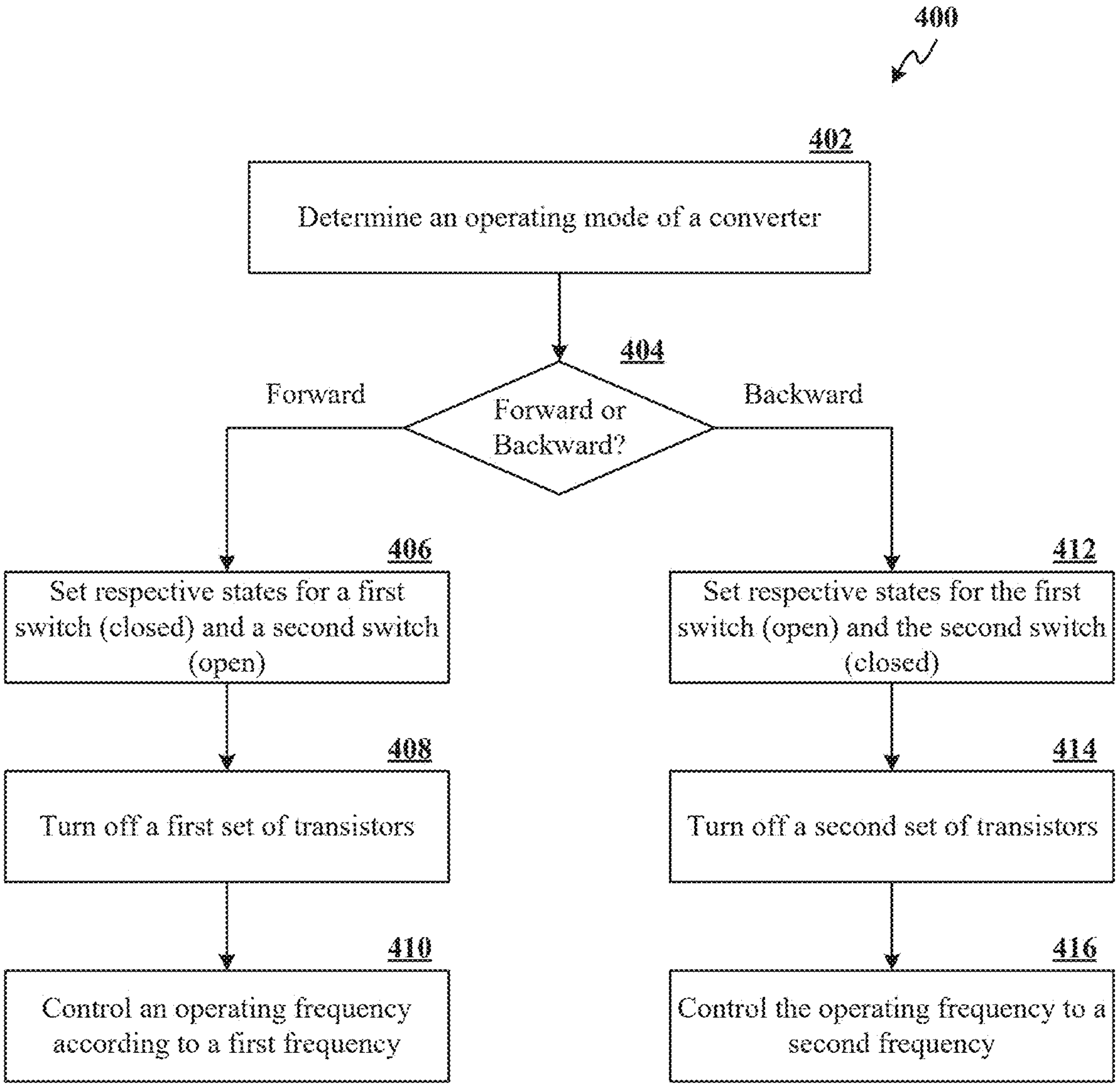
FIG. 4 illustrates a flow chart of an exemplary, non-limiting implementation for controlling the converter according to various aspects.

Turning to FIG. 4, illustrated is a flow chart of an exemplary, non-limiting implementation of a method 400 for controlling the converter. Method 400 may commence at reference numeral 402 where an operating mode of the converter is determined. At 404, a decision is made as to whether the operating mode is a forward mode or a backward mode. If the operating mode is a forward mode, method 400 transitions to reference numeral 406 where respective states of a first switch and a second switch are set. For instance, the first switch may be closed and the second switch may be open. These states operate to couple a first secondary inductor to a primary inductor of the converter and remove a second secondary inductor. At 408, a first set of transistors are turned off. For example, the first set of transistors may be one leg of transistors of a three-leg rectifier. At reference numeral 410, an operating frequency is controlled according to a first frequency. In an example, the first frequency may be a resonant frequency or higher.

If the operating mode is a backward mode, the method 400 transitions to reference numeral 412 where respective states of a first switch and a second switch are set. For instance, the first switch may be open and the second switch may be closed. These states operate to couple the second secondary inductor to a primary inductor of the converter and remove the first secondary inductor. At 414, a second set of transistors are turned off. For example, the second set of transistors may be one leg of transistors of a three-leg rectifier. The second set may be different from the first set. At reference numeral 416, the operating frequency is controlled according to a second frequency. In an example, the second frequency may be used for all transistors in the converter.

FIG. 5 is a comparison between a performance of the converter described herein and a performance of a conventional LLC resonant converter. As shown in tables 502 and 504, the converter described herein provides a wide input and output voltage range in forward mode and backward mode. As shown in table 506, a conventional converter provides insufficient performance in backward mode.

According to an aspect, a converter is provided. The converter includes a primary side having a primary inductor and a secondary side having at least two secondary inductors. The converter is operable in at least two operating modes and a different secondary inductor of the at least two secondary inductors is disconnected in each operating mode of the at least two operating modes.

In an example, the secondary side includes a first secondary inductor and a second secondary inductor. The converter is operable in a forward mode and a backward mode. The first secondary inductor is connected in the forward mode and the second secondary inductor is disconnected. The first secondary inductor is disconnected in the back mode and the second secondary inductor is connected. In another example, the first secondary inductor and the secondary inductor are connected in the forward mode.

In another example, the primary side further includes an inverter and an inductor-inductor-capacitor (LLC) resonant tank. In yet another example, the secondary side further includes at least two switches, wherein a respective switch of the at least two switches remove a respective secondary inductor of the at least two secondary inductors. In a further example, the secondary side further includes a three-leg rectifier. In another example, the primary side is operatively coupled to a power supply or a load. In another example, the secondary side is operatively coupled to a battery.

In another aspect, a system is provided. The system includes a bidirectional direct current to direct current (DC-DC) converter, at least one of a power supply or a load operatively coupled to a first side of the bidirectional DC-DC converter, and a battery operatively coupled to a second side of the bidirectional DC-DC converter. The bidirectional DC-DC converter includes a primary side having a primary inductor and a secondary side. The secondary side includes a first secondary inductor configured to provide a first gain in a forward mode, a second secondary inductor configured to provide a second gain in a backward mode, a first switch configured to operatively couple the first secondary inductor based on an operating mode, and a second switch configured to operatively couple the second secondary inductor based on the operating mode.

In an example, the first gain is based on the primary inductor, the inductor and the capacitor in series, the first secondary inductor, and an operating frequency. The second gain is based on the primary inductor, the inductor and the capacitor in series, the second secondary inductor, and the operating frequency.

In another example, the first switch connects the first secondary inductor and the second switch disconnects the second secondary inductor in the forward mode. In another example, the first switch disconnects the first secondary inductor and the second switch connects the second secondary inductor in the backward mode. In another example, the primary side further includes a resonant tank and a full bridge inverter. In yet another example, the full bridge inverter includes two legs, where each leg includes two transistors, and where transistors of the full bridge inverter operate below a resonant frequency in the forward mode and operate at a set frequency in the backward mode.

In a further example, the secondary side further includes a three-leg rectifier. the three-leg rectifier includes three legs, where each leg includes two transistors, and where a first leg is turned off in the forward mode and a second leg is turned off in the backward mode, the first leg and the second leg being different.

According to yet another aspect, a bidirectional converter for operatively coupling a battery to at least one of a load or a power supply is provided. The converter a transformer having a primary inductor coupled to two secondary inductors, the two secondary inductors including a first secondary inductor and a second secondary inductor. The converter also includes a resonant tank on the primary side of the transformer. In addition, the converter includes a full bridge inverter on the primary side of the transformer, the full bridge inverter having two legs, each leg having two transistors. Further, the converter includes a first switch on the secondary side of the transformer, the first switch configured to operatively connect the first secondary inductor based on an operating mode. The converter also includes a second switch on the secondary side of the transformer, the second switch configured to operatively connect the second secondary inductor based on the operating mode. Still further, the converter includes a three-leg rectifier on the secondary side of the transformer, where each leg includes two transistors. In a forward mode, the first switch connects the first secondary inductor, the second switch disconnects the second secondary inductor, and a first leg of the three-leg rectifier is turned off to provide a first gain. In a backward mode, the first switch disconnects the first secondary inductor, the second switch connects the second secondary inductor, and a second leg of the three-leg rectifier is turned off to provide a second gain.

The foregoing description and examples has been set forth merely to illustrate the disclosure and are not intended as being limiting. Each of the disclosed aspects and embodiments of the present disclosure may be considered individually or in combination with other aspects, embodiments, and variations of the disclosure. In addition, unless otherwise specified, none of the steps of the methods of the present disclosure are confined to any particular order of performance. Modifications of the disclosed embodiments incorporating the spirit and substance of the disclosure may occur to persons skilled in the art and such modifications are within the scope of the present disclosure. Furthermore, all references cited herein are incorporated by reference in their entirety.

Conditional language used herein, such as, among others, "can," "might," "may," "e.g.," and the like, unless specifically stated otherwise, or otherwise understood within the context as used, is generally intended to convey that some embodiments include, while other embodiments do not include, certain features, elements, and/or states. Thus, such conditional language is not generally intended to imply that features, elements, blocks, and/or states are in any way required for one or more embodiments or that one or more embodiments necessarily include logic for deciding, with or without author input or prompting, whether these features, elements and/or states are included or are to be performed in any particular embodiment.

Conjunctive language, such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

The terms "approximately," "about," and "substantially" as used herein represent an amount close to the stated amount that still performs a desired function or achieves a desired result. For example, in some embodiments, as the context may dictate, the terms "approximately", "about", and "substantially" may refer to an amount that is within less than or equal to 10% of the stated amount. The term "generally" as used herein represents a value, amount, or characteristic that predominantly includes or tends toward a particular value, amount, or characteristic. As an example, in certain embodiments, as the context may dictate, the term "generally parallel" can refer to something that departs from exactly parallel by less than or equal to 20 degrees.

Unless otherwise explicitly stated, articles such as "a" or "an" should generally be interpreted to include one or more described items. Accordingly, phrases such as "a device configured to" are intended to include one or more recited devices. Such one or more recited devices can be collectively configured to carry out the stated recitations. For example, "a processor configured to carry out recitations A, B, and C" can include a first processor configured to carry out recitation A working in conjunction with a second processor configured to carry out recitations B and C.

The terms "comprising," "including," "having," and the like are synonymous and are used inclusively, in an open-ended fashion, and do not exclude additional elements, features, acts, operations, and so forth. Likewise, the terms "some," "certain," and the like are synonymous and are used in an open-ended fashion. Also, the term "or" is used in its inclusive sense (and not in its exclusive sense) so that when used, for example, to connect a list of elements, the term "or" means one, some, or all of the elements in the list.

Overall, the language of the claims is to be interpreted broadly based on the language employed in the claims. The language of the claims is not to be limited to the non-exclusive embodiments and examples that are illustrated and described in this disclosure, or that are discussed during the prosecution of the application.

Certain features that are described in this disclosure in the context of separate implementations can be implemented in combination in a single implementation. Conversely, various features that are described in the context of a single implementation can be implemented in multiple implementations separately or in any suitable subcombination. Although features may be described herein as acting in certain combinations, one or more features from a claimed combination can, in some cases, be excised from the combination, and the combination may be claimed as any subcombination or variation of any subcombination.

While the methods and devices described herein may be susceptible to various modifications and alternative forms, specific examples thereof have been shown in the drawings and are herein described in detail. It should be understood, however, that the invention is not to be limited to the particular forms or methods disclosed, but, to the contrary, the invention is to cover all modifications, equivalents, and alternatives falling within the spirit and scope of the various embodiments described and the appended claims. Further, the disclosure herein of any particular feature, aspect, method, property, characteristic, quality, attribute, element, or the like in connection with an embodiment can be used in all other embodiments set forth herein. Any methods disclosed herein need not be performed in the order recited. Depending on the embodiment, one or more acts, events, or functions of any of the algorithms, methods, or processes described herein can be performed in a different sequence, can be added, merged, or left out altogether (e.g., not all described acts or events are necessary for the practice of the algorithm). In some embodiments, acts or events can be performed concurrently, e.g., through multi-threaded processing, interrupt processing, or multiple processors or processor cores or on other parallel architectures, rather than sequentially. Further, no element, feature, block, or step, or group of elements, features, blocks, or steps, are necessary or indispensable to each embodiment. Additionally, all possible combinations, subcombinations, and rearrangements of systems, methods, features, elements, modules, blocks, and so forth are within the scope of this disclosure. The use of sequential, or time-ordered language, such as "then," "next," "after," "subsequently," and the like, unless specifically stated otherwise, or otherwise understood within the context as used, is generally intended to facilitate the flow of the text and is not intended to limit the sequence of operations performed. Thus, some embodiments may be performed using the sequence of operations described here, while other embodiments may be performed following a different sequence of operations.

Moreover, while operations may be depicted in the drawings or described in the specification in a particular order, such operations need not be performed in the particular order shown or in sequential order, and all operations need not be performed, to achieve the desirable results. Other operations that are not depicted or described can be incorporated in the example methods and processes. For example, one or more additional operations can be performed before, after, simultaneously, or between any of the described operations. Further, the operations may be rearranged or reordered in other implementations. Also, the separation of various system components in the implementations described herein should not be understood as requiring such separation in all implementations, and it should be understood that the described components and systems can generally be integrated together in a single product or packaged into multiple products. Additionally, other implementations are within the scope of this disclosure.

Some embodiments have been described in connection with the accompanying figures. Certain figures are drawn and/or shown to scale, but such scale should not be limiting, since dimensions and proportions other than what are shown are contemplated and are within the scope of the embodiments disclosed herein. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, any methods described herein may be practiced using any device suitable for performing the recited steps.

The methods disclosed herein may include certain actions taken by a practitioner; however, the methods can also include any third-party instruction of those actions, either expressly or by implication.

In summary, various embodiments and examples of a bidirectional DC-DC converter have been disclosed. Although the bidirectional DC-DC converter have been disclosed in the context of those embodiments and examples, this disclosure extends beyond the specifically disclosed embodiments to other alternative embodiments and/or other uses of the embodiments, as well as to certain modifications and equivalents thereof. This disclosure expressly contemplates that various features and aspects of the disclosed embodiments can be combined with, or substituted for, one another. Thus, the scope of this disclosure should not be limited by the particular disclosed embodiments described herein, but should be determined only by a fair reading of the claims that follow.

The invention claimed is:

1. A converter, comprising:

a primary side having a primary inductor; and a secondary side having at least a first secondary inductor and a second secondary inductor, wherein the converter is operable in at least including a forward mode and a backward mode and a different secondary inductor of the secondary side is disconnected in each of the forward mode and the backward mode, and wherein the first secondary inductor is disconnected in the backward mode and the second secondary inductor is connected in the backward mode.

2. The converter of claim 1, wherein the first secondary inductor is connected in the forward mode and the second secondary inductor is disconnected.

3. The converter of claim 1, wherein the primary side further includes an inverter and an inductor-inductor-capacitor (LLC) resonant tank.

4. The converter of claim 1, wherein the secondary side further includes at least two switches, wherein a respective switch of the at least two switches remove a respective secondary inductor of the at least two secondary inductors.

5. The converter of claim 1, wherein the secondary side further includes a three-leg rectifier.

6. The converter of claim 1, wherein the first secondary inductor and the secondary inductor are connected in a second forward mode.

7. The converter of claim 1, wherein the primary side is operatively coupled to a power supply or a load.

8. The converter of claim 1, wherein the secondary side is operatively coupled to a battery.

9. A system, comprising:

a bidirectional direct current to direct current (DC-DC) converter;

at least one of a power supply or a load operatively coupled to a first side of the bidirectional DC-DC converter; and a battery operatively coupled to a second side of the bidirectional DC-DC converter, wherein the bidirectional DC-DC converter includes:

a primary side having a primary inductor; and a secondary side having:

a first secondary inductor configured to provide a first gain in a forward mode;

a second secondary inductor configured to provide a second gain in a backward mode;

a first switch configured to operatively couple the first secondary inductor based on an operating mode; and a second switch configured to operatively couple the second secondary inductor based on the operating mode wherein the first switch disconnects the first secondary inductor and the second switch connects the second secondary inductor in the backward mode.

10. The system of claim 9, wherein the first gain is based on the primary inductor, the inductor and the capacitor in series, the first secondary inductor, and an operating frequency, and wherein the second gain is based on the primary inductor, the inductor and the capacitor in series, the second secondary inductor, and the operating frequency.

11. The system of claim 9, wherein the first switch connects the first secondary inductor and the second switch disconnects the second secondary inductor in the forward mode.

12. The system of claim 9, wherein the primary side further includes a resonant tank and a full bridge inverter.

13. The system of claim 12, wherein the full bridge inverter includes two legs, wherein each leg includes two transistors, and wherein transistors of the full bridge inverter operate below a resonant frequency in the forward mode and operate at a set frequency in the backward mode.

14. The system of claim 9, wherein the secondary side further includes a three-leg rectifier.

15. The system of claim 14, wherein the three-leg rectifier includes three legs, wherein each leg includes two transistors, and wherein a first leg is turned off in the forward mode and a second leg is turned off in the backward mode, the first leg and the second leg being different.

16. A bidirectional converter for operatively coupling a battery to at least one of a load or a power supply, comprising:

a transformer having a primary inductor coupled to two secondary inductors, the two secondary inductors including a first secondary inductor and a second secondary inductor;

a resonant tank on the primary side of the transformer;

a full bridge inverter on the primary side of the transformer, the full bridge inverter having two legs, each leg having two transistors;

a first switch on the secondary side of the transformer, the first switch configured to operatively connect the first secondary inductor based on an operating mode;

a second switch on the secondary side of the transformer, the second switch configured to operatively connect the second secondary inductor based on the operating mode; and a three-leg rectifier on the secondary side of the transformer, wherein each leg includes two transistors, wherein, in a forward mode, the first switch connects the first secondary inductor, the second switch disconnects the second secondary inductor, and a first leg of the three-leg rectifier is turned off to provide a first gain, and wherein, in a backward mode, the first switch disconnects the first secondary inductor, the second switch connects the second secondary inductor, and a second leg of the three-leg rectifier is turned off to provide a second gain.

* * * * *